Patented Jan. 16, 1951

UNITED STATES PATENT OFFICE 2,538,025

CONTAINER FOR AND PROCESS OF PRESERVING PERISHABLE FOODSTUFFS

Garnett V. Moore and Carroll R. Irons, Midland, Mich., assignors to The Dow Chemical Company, Midland, Mich., a corporation of Delaware No Drawing. Application November 29, 1947, Serial No. 788,973

2 Claims. (Cl. 229—53)

This invention relates to a particular heat-shrinkable container for packaging foodstuffs preparatory to storage or freezing, and to a method whereby such container may be used.

The use of a stretched and heat-shrinkable envelope or bag of unvulcanized rubber for packaging and preserving foodstuffs to be stored or frozen has been disclosed by De Poix in U. S. Patents 2,240,245 and 2,376,583. Such bags are disclosed by the said patents as being made by electrode-position of unvulcanized rubber from latex on a suitable form, the bag is stripped from the form and is stretched pneumatically to a size larger than the article which it is intended to contain, and becomes temporarily "racked," i. e. if kept cool it retains its enlarged dimensions. Food is placed in the bag, which is then evacuated and finally subjected to heat to cause the bag to shrink in an attempt to regain its original size. The bag thereby is caused to conform closely to the enclosed article, and, being quite inelastic, affords considerable protection even if it is accidentally punctured, as it does not tend to pull away from the resulting opening and expose large areas of the contents.

Some packers do not have facilities for stretching the unvulcanized rubber bags. This is especially true of those who may package foods this way only occasionally or in small quantities, and for whom even small capital investments in special equipment are unwarranted. For such users, a previously stretched bag of unvulcanized rubber is available commercially. It has been found, however, that such bags do not retain their racked condition indefinitely, and that great care must be taken to insure that stretched unvulcanized rubber bags are stored and shipped, before use, under carefully controlled conditions. It has even been found that exposure of such bags to summer heat results in marked shrinkage and reduction in utility.

It would be preferable to have a bag capable of performing the functions of the unvulcanized rubber bags, but which exhibits no tendency to shrink at any temperature encountered in shipment and storage, even of long duration. It must, of course, be capable of being shrunk sufficiently to fit snugly about the article being packed therein. For greatest utility, it should shrink from 30 to 50 per cent when exposed briefly to a temperature between 85° and 100° C. It should not communicate any odor or taste to the packaged food. It should be inelastic both before and after shrinking. If possible, it should be clear and transparent, rather than having the bare translucence of unvulcanized rubber bags. Finally, it must be capable of being stored for prolonged periods at freezing temperatures without becoming brittle, if such storage should be necessary.

It is known by X-ray diffraction studies that certain copolymers of vinylidene chloride are crystalline. It is also known that they may be formed into films wherein the submicroscopic crystallites are aligned parallel to the film surface (which condition may be referred to as "planar orientation"), by extruding the fused copolymer, cooling it to or below room temperature to provide a temporarily non-crystalline or supercooled form thereof, and stretching to effect crystallization and orientation. Such oriented crystalline films are known to shrink when heated to a temperature approaching the softening point. The strength and transparency of crystalline vinylidene chloride copolymer films, in the stretched and oriented condition, are much greater than those of unvulcanized rubber, and such films are quite inelastic. If one or more of them can be found which can be made to shrink the desired 30 to 50 per cent or more at a moderate and readily producible temperature up to the boiling point of water, it might prove useful for the intended purpose.

It is an object of the present invention to provide a bag or pouch for packaging foodstuffs, which exhibits no tendency to shrink under any conditions normally encountered in shipment and storage, which is capable of shrinking from 30 to 50 per cent or more when heated to a temperature of 85° to 100° C., which does not become brittle at freezing temperatures, which is substantially inelastic, and which does not contribute any odor or taste to food packed in contact therewith. A related object is to provide such a bag composed of a crystalline copolymer of vinylidene chloride. A further object is to provide a process for packaging foods in such a bag preparatory to storage or freezing. Another object is to provide an article of food, packed snugly in such a bag.

In accordance with the present invention, the foregoing objects may be realized and a bag having the desired characteristics may be prepared from a particular copolymer of vinylidene chloride and vinyl chloride. The bag of the invention is made of a copolymer of from 70 to 77 per cent vinylidene chloride and complementarily from 30 to 23 per cent vinyl chloride, and preferably one containing from 72 to 76 per cent vinylidene chloride and from 28 to 24 per cent vinyl chloride. Copolymers within the stated narrow ranges of proportions may be extruded, preferably in tubular form, and stretched both radially and longitudinally to form a flexible transparent film from which bags or pouches may be made having the desired characteristics. Other copolymers of vinylidene chloride and vinyl chloride, i. e. those having less than 70 per cent or more than 77 per cent vinylidene chloride in the copolymer, do not form films having the required shrinkage characteristics. For example, a 65 per cent vinylidene chloride and 35 per cent vinyl chloride copolymer is too amorphous, and cannot be extruded and pneumatically stretched in the usual manner to form shrinkable films. Instead, the extruded tube ruptures when cold-stretched, without reaching the definite end point which is always found in blowing the more crystalline films. Similarly, a copolymer of 80 per cent or more vinylidene chloride and 15 per cent or less vinyl chloride is too highly crystalline, and when extruded and stretched to produce a strong flexible film, shrinks far too little upon exposure to heat. Further, the latter type of (too highly crystalline) copolymer, when in film form, must be heated to a temperature considerably above the boiling point of water to effect full shrinkage, and would be impractical for use by small packers even if it had the other required characteristics. At 85° C. such a film usually shrinks less than 5 per cent and at 100° C. it shrinks less than 10 per cent. It does not shrink as much as 30 per cent until heated to temperatures of about 140° C., and even higher temperatures are required with some of the copolymers containing 92 per cent or more of vinylidene chloride, balance vinyl chloride.

The narrow range of copolymers which finds use in the present invention may be produced, for example, by polymerizing together in aqueous emulsion, suitably with a redox catalyst, a mixture of from 70 to 75 per cent of vinylidene chloride and from 30 to 25 per cent of vinyl chloride, until the polymerization is at least 85 per cent complete, and recovering the copolymer from the resulting latex-like dispersion. A monomer mixture of 73 per cent vinylidene chloride and 27 per cent vinyl chloride gives consistently a particularly useful copolymer for the present purpose. Copolymers in the previously defined useful range are most easily fabricated by extrusion after being mixed with a small amount of plasticizer and heat stabilizer to prevent thermal degradation during extrusion, though it is not essential that the plasticizer be left in the film from which the bag or pouch is made. A suitable plasticizer combination for use in the extrusion mixture is about 3 per cent of ethyl phthalyl ethyl glycollate and about 4 per cent of dibutyl sebacate, based on the weight of copolymer, and 0.5 per cent of tetrasodium pyrophosphate serves to protect the composition against thermal decomposition during extrusion.

With ordinary care in shipping and storage, the highest temperature to which the bags of the present invention may be subjected prior to use will not exceed about 50° C. (122° F.). At such a temperature, these bags show no tendency to shrink. In contrast thereto, a previously stretched unvulcanized rubber bag, at a temperature of 50° C., undergoes considerable shrinkage, and if such a temperature condition persists, the rubber bags return to their original, unstretched dimensions. Accordingly, the present bags may be shipped in any climate and stored until needed without change in dimension. Since, in addition, they exhibit no tackiness or self-sealing tendencies at temperatures below 100° C., no special precautions need be observed in storage to prevent cohesion between contiguous bags in a bundle, or between opposed faces of the same bag.

The new bags are impervious to water in both the liquid and the vapor state, so they may be used safely to pack foods with liquid components (e. g. meat and gravy or fruits in syrup) as well as such hydrous foods as raw meat, fresh fruits and vegetables, and the like, without danger of dehydration during storage, either at moderate temperatures or under the normally dehydrating conditions of storage in a refrigerator or freezer.

As stated, the bags are prepared by extrusion of the hot copolymer in tubular form, followed by a cooling step to produce the temporarily non-crystalline and ductile supercooled state in the copolymer, in which state it is capable of being cold-worked to effect recrystallization. The supercooled tube is expanded pneumatically in a radial direction and is stretched mechanically (as between stretching rollers) along its longitudinal axis, nearly to the limit of which it is capable without rupture. This is about 3 to 5 times its diameter as extruded, and about 2 to 4 times its extruded length per unit weight. When this amount of distention occurs, the tube is no longer supercooled, and the submicroscopic crystallites are found, by X-ray diffraction studies, to be highly oriented in the sense that they lie in the plane of the film and not vertical to the film surface. Further stretching requires a much greater force than that required to effect crystallization, and results in no more than about 10 per cent further change in dimension which is lost immediately when such tension is released. Usually, however, application of such additional tension results in rupture of the film tube. The stretched and oriented tube may be cut to the desired length, and bags or pouches may be prepared by sealing one end of each length of cut tube. Sealing is preferably accomplished by flattening the tube and heating the end thereof to a fusion temperature for about one second, under moderate pressure. This may be done in any of several types of heat sealing machines, or it may be done by pressing the end of the tube with a hot iron. The resulting weld is usually at least as strong as the rest of the bag and remains sealed during subsequent filling and shrinking of the bag. The bags may be made, if desired, with projections or pockets or other special shapes, by welding the flattened tube along desired contour lines, to adapt the container to special uses, such as packaging articles of irregular shape, such as the legs or carcasses of animals.

The method of the invention is carried out by placing the food to be protected in one of the described bags of a size just slightly larger than the food, expressing or evacuating air from the package, sealing the open end thereof, suitably by welding as with a hot iron or by twisting and tying the end portion, and heating the sealed package to a temperature between 85° and 100° C., to shrink the bag about the enclosed food. The shrinking operation is most conveniently and effectively carried out by immersing the sealed package in water heated to the stated temperature range. Facilities for the packaging operation are available wherever food may be packed for storage.

The following examples illustrate the practice of the invention:

*Example 1*

A copolymer, having an analysis of 72.6 per cent vinylidene chloride and 27.4 per cent vinyl chloride, was prepared by polymerizing together 5621 pounds of vinylidene chloride monomer and 2079 pounds of vinyl chloride monomer, in 19250 pounds of water containing 192.5 pounds of the sodium salt of the dihexyl ester of sulfosuccinic acid (emulsifier), 77 pounds of 35 per cent hydrogen peroxide and 1.5 pounds of ferric nitrate as catalysts. Polymerization was 90 per cent complete after 50 hours at 35° C. The polymer was coagulated from its latex, and was washed and dried. It had a melting point of 148° C., and its 2 per cent solution in orthodichlorobenzene at 120° C. had a viscosity of 1.192 centipoises. The copolymer was extruded through tube-forming orifices of various diameters, into a water bath at 20° C. to supercool the tube, which was then conducted between two pairs of pinch rollers, the second set operating at a peripheral speed 3 times that of the first set. The tube was also distended radially between the two sets of rollers by means of a trapped air bubble which increased the tube diameter about fourfold. The so-stretched crystalline film, in tubular form, was cut transversely to various lengths. One end of each length of film tube was sealed by flattening the tube and heating the end briefly to 150° C., under moderate pressure. Test specimens of the film were found to shrink about 45 to 50 per cent when heated in water at 85° C. and to remain flexible at temperatures of −40° C. and lower. Cuts of meat, such as roasts, legs, quarters, and whole carcasses of lamb, chickens and the like, as well as numerous other types of food, including fruits, vegetables, and cheeses, could be fitted into bags of appropriate dimension, and sealed in, suitably after evacuation, by heating the open end in the manner described above. After such a sealed package had been prepared, the entire package was immersed briefly, for a period of from 10 seconds to one minute, in water at a temperature of 85° to 100° C. The film thereupon shrank down upon the contents of the package, forming a tight, compressive, inelastic wrapper thereon which was itself odorless and which contributed no taste or odor to the packed food.

*Example 2*

In a manner similar to that described in Example 1, a copolymer was produced containing about 74 per cent vinylidene chloride and 26 per cent vinyl chloride. It had a melting point of 146° C., a viscosity of 1.060 at 120° C. in 2 per cent solution in orthodichlorobenzene, and was soluble to the extent of less than 3 per cent in acetone. When extruded and stretched to form a film tube, in the manner previously described, the resulting film exhibited 32 per cent shrinkage at 85° C. and was also flexible at sub-zero temperatures. Bags made from the copolymer films were useful in the shrink-packaging of foodstuffs for storage.

Other copolymers of vinylidene chloride and vinyl chloride within the previously defined range of 70 to 77 per cent vinylidene chloride, balance vinyl chloride, have been found to have melting points ranging from about 135° to 163° C., and their extruded and stretched films shrink from 30 to 50 per cent in water at 85° C. By way of contrast, a copolymer of 60 per cent vinylidene chloride and 40 per cent vinyl chloride has a melting point of 118° C. but cannot be super-cooled and cold-stretched to form a shrinkable film because the copolymer is essentially amorphous and its films which, at best, are hard to make, exhibit no crystalline orientation and hence have no appreciable internal strain which can be activated by heat treatment to produce shrinkage. On the other hand, a copolymer of 85 per cent vinylidene chloride and 15 per cent vinyl chloride has a melting point near 180° C. and its films, while highly crystalline, exhibit little shrinkage until heated to a temperature near 150° C., a temperature not readily attainable except in special equipment.

The bags, envelopes or pouches of the present invention (often referred to herein simply as "bags") are most useful when the wall thickness thereof is of the order of 1.5 to 4 mils, though thicknesses of 0.5 or 1.0 mil are also useful. In these thicknesses they are both flexible and tough, and occupy little space when shipped in large quantities. Since the oriented crystalline copolymer bags are highly impermeable to water and its vapor, and remain flexible at very low temperatures encountered in food freezers, can be stored without shrinkage at summer temperatures and yet shrink readily at 85° to 100° C., they represent a marked improvement over other bags heretofore known for similar purposes.

While probably the greatest need for a close fitting moisture impervious wrapping about a food product is encountered with those foods which must be refrigerated or frozen in order to be preserved, this is not the only use for such wrappings. Many foods which can be stored at ordinary room temperature should either be protected from dehydration or must be tightly wrapped in order to prevent mold growth or bacterial contamination. Examples of such foods are cheese, fish and smoked or spiced meats, such as bacon, ham, salami and the like. These and numerous other foods which may be packed according to the method of the present invention in the new type of heat-shrinkable bag do not require refrigeration for their satisfactory preservation. All that is required of the packaged food is that it be stored at a beneficial temperature.

We claim:

1. A flexible bag, suitable for enclosing foodstuffs, made of a copolymer of from 70 to 77 per cent vinylidene chloride and from 30 to 23 per cent vinyl chloride, wherein the submicroscopic crystallites have planar orientation, characterized by retention of dimensions at temperatures up to 50° C. and by shrinking at least 30 per cent when heated in water at 85° to 100° C.

2. A flexible bag, suitable for enclosing foodstuffs, made of a copolymer of about 73 per cent vinylidene chloride and complementarily about 27 per cent vinyl chloride, wherein the submicroscopic crystallites have planar orientation, characterized by retention of dimensions at temperatures up to 50° C. and by shrinking at least 30 per cent when heated in water at 85° to 100° C.

GARNETT V. MOORE.
CARROLL R. IRONS.

REFERENCES CITED

The following references are of record in the file of this patent:

UNITED STATES PATENTS

| Number | Name | Date |
|---|---|---|
| 2,235,782 | Wiley et al. | Mar. 18, 1941 |
| 2,420,310 | Goodman | May 13, 1947 |

OTHER REFERENCES

Reinhardt: "Industrial and Engineering Chemistry," vol. 35, No. 4, pages 426 to 428.

Goggin et al.: Article entitled "Vinylidene Chloride Polymers" presented in the Symposium on Recent Progress in High Polymer Plastics held by Paint, Varnish, and Plastics Division, American Chemical Society, Atlantic City, N. J., March 18, 1942, page 14 (Ind. Eng. Chem., 34, 327–332, March 18, 1942).